US011057198B2

United States Patent
Linder

(10) Patent No.: US 11,057,198 B2
(45) Date of Patent: Jul. 6, 2021

(54) UTILIZATION OF A PROXY TECHNIQUE IN ESCROW ENCRYPTION KEY USAGE

(71) Applicant: Assured Enterprises, Inc., Vienna, VA (US)

(72) Inventor: Peter Robert Linder, Sugar Land, TX (US)

(73) Assignee: Assured Enterprises, Inc., Vienna, VA (US)

( * ) Notice: Subject to any disclaimer, the term of this patent is extended or adjusted under 35 U.S.C. 154(b) by 302 days.

(21) Appl. No.: 15/446,788

(22) Filed: Mar. 1, 2017

(65) Prior Publication Data
US 2018/0254891 A1    Sep. 6, 2018

Related U.S. Application Data

(60) Provisional application No. 62/303,875, filed on Mar. 4, 2016.

(51) Int. Cl.
*H04L 9/00*     (2006.01)
*H04L 9/08*     (2006.01)
(Continued)

(52) U.S. Cl.
CPC ......... *H04L 9/085* (2013.01); *G06Q 20/3823* (2013.01); *G06Q 20/3827* (2013.01);
(Continued)

(58) Field of Classification Search
CPC ..... H04L 9/085; H04L 9/0643; H04L 9/0861; H04L 9/0894; H04L 9/14; H04L 63/0281;
(Continued)

(56) References Cited

U.S. PATENT DOCUMENTS

| 5,675,649 A | * | 10/1997 | Brennan | ................. H04L 9/085 380/286 |
| 6,662,299 B1 | * | 12/2003 | Price, III | ................. G06F 21/31 713/171 |

(Continued)

FOREIGN PATENT DOCUMENTS

WO    2016/022864    2/2016

OTHER PUBLICATIONS

International Search Report and Written Opinion for PCT Patent Application No. PCT/US2017/020359, dated Jun. 8, 2017; 10 pages, dated Jun. 8, 2017.

(Continued)

*Primary Examiner* — Fatoumata Traore
*Assistant Examiner* — Carlton Johnson
(74) *Attorney, Agent, or Firm* — Baker Botts L.L.P.

(57) ABSTRACT

In one or more embodiments, an encryption key of a device may be split into multiple segments. One of the segments may be retained by an owner of the device, and some of the segments may be distributed to multiple entities. For example, one of the segments may be provided to a service provider, and one of the segments may be provided to an escrow agent. The escrow agent may process its segment, provide information based on its segment to a public ledger, and destroy its segment. A proxy agent may retrieve, from the public ledger, the information based on the segment provided to the escrow agent and obtain compensation. When the proxy agent obtains the compensation, the public ledger exhibits information utilizable to obtain the segment provided to the escrow agent. With the segments provided to the escrow agent and the service provider, the encryption key may be obtained.

37 Claims, 10 Drawing Sheets

(51) Int. Cl.
*H04L 29/06* (2006.01)
*G06Q 20/38* (2012.01)
*H04L 9/32* (2006.01)

(52) U.S. Cl.
CPC ....... *G06Q 20/3829* (2013.01); *H04L 9/0894* (2013.01); *H04L 9/3236* (2013.01); *H04L 63/0281* (2013.01); *H04L 63/0428* (2013.01); *G06Q 2220/00* (2013.01); *H04L 2209/38* (2013.01)

(58) Field of Classification Search
CPC .. H04L 9/0822; H04L 9/0637; G06Q 20/3829
See application file for complete search history.

(56) References Cited

U.S. PATENT DOCUMENTS

| | | | |
|---|---|---|---|
| 7,660,798 B1* | 2/2010 | Ludwig | G06F 21/6209 707/783 |
| 2008/0310636 A1 | 12/2008 | Bennett | |
| 2011/0176675 A1 | 7/2011 | Hughes et al. | |
| 2015/0149769 A1 | 5/2015 | D'Souza | |
| 2015/0188703 A1* | 7/2015 | Yu | H04L 9/0891 380/46 |
| 2015/0244690 A1 | 8/2015 | Mossbarger | |
| 2016/0140653 A1* | 5/2016 | McKenzie | G06Q 40/02 705/69 |

OTHER PUBLICATIONS

Kurihara, Jun, et al., "A new (k, n)-threshold secret sharing scheme and its extension," International Conference on Information Security, Springer Berlin Heidelberg, 2008; 28 pages, 2008.

Wagner, Neal R. "The Laws of Cryptography with Java Code", 2003; 334 pages, 2003.

Leach, Paul J., et al., "A Universally Unique Identifier (UUID) URN Namespace." Network Working Company, Standards Track, Jul. 2005; 32 pages, 2005.

Kosba, Ahmed, et al. "Hawk: The Blockchain Model of Cryptography and Privacy-Preserving Smart Contracts." Security and Privacy (SP), 2016 IEEE Symposium on. IEEE, 2016; 32 pages, 2016.

* cited by examiner

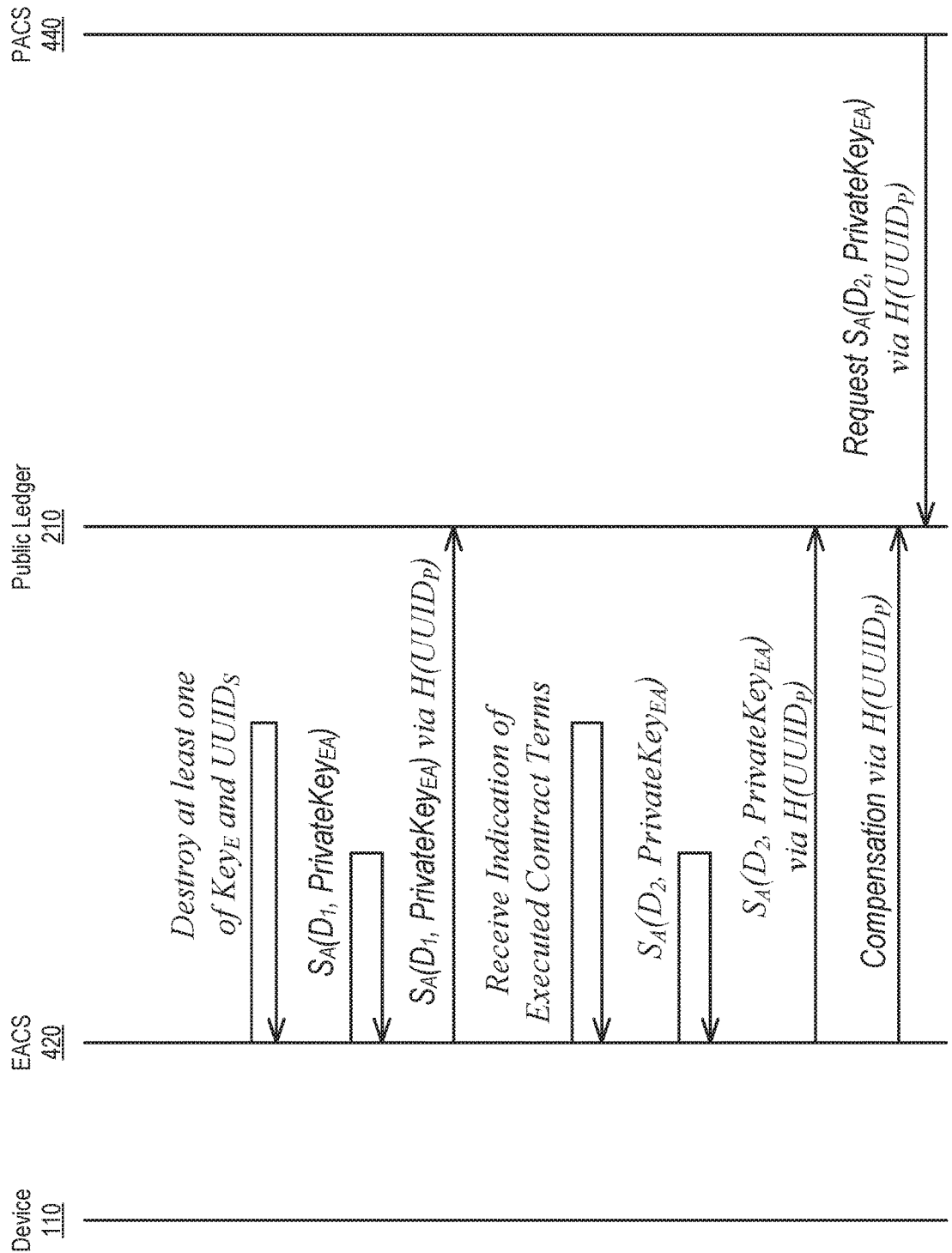

UTILIZATION OF A PROXY TECHNIQUE IN ESCROW ENCRYPTION KEY USAGE

PRIORITY CLAIM

The Present Application claims the benefit of priority from U.S. Provisional Patent Application Ser. No. 62/303,875, filed 4 Mar. 2016, entitled "Decryption Contract Enforcement Tool", which is hereby incorporated by reference for all purposes.

BACKGROUND

Field of the Disclosure

This disclosure relates generally to utilizing encryption with computing devices and more particularly to utilizing encryption with computing devices via escrow keys.

Description of the Related Art

Use of encryption both for data storage and for end-to-end communications has grown as levels of cybercrime have increased. Benefits created by various applications of cryptography to prevent crime is understood and supported. Encryption solutions where only an owner of a device possesses information that can decrypt information associated with the device is a simple approach but may introduce various issues. In one example, the owner of the device may forget or lose a password or other information that can be utilized to decrypt information associated with the device. In a second example, a device issued by a corporation or a government agency to its employee or contractor may include encrypted data to which the corporation or the government agency may not have access, even if the corporation or the government agency owns the data that was encrypted or otherwise has a right to the data that was encrypted. In another example, a law enforcement officer may have no ability to decrypt the data and/or communications of a suspect even after a legal warrant has been issued, which provides the law enforcement officer a right to access that the data that was encrypted.

Concerns from law enforcement agencies associated with their inability to decrypt data and communications of suspects has resulted in repeated calls by politicians for government decryption backdoors to give law enforcement agencies access desired by these law enforcement agencies. Knowledgeable security experts have invariably pointed out that security-by-obscurity never holds up to the test of time. Moreover, the same backdoors created for law enforcement could be discovered and exploited by criminals.

Further, usage of biometrics, such as fingerprint information, as a strategy to prevent loss of passwords and/or to provide access when needed can also be problematic. Biometrics can often be copied and cannot be changed if stolen. The same fingerprint that may unlock a smartphone may also be present all over the phone when viewed under the correct lighting conditions, for example.

Trusting an escrow agent that holds decryption keys in escrow can be a weakness, as well. Even if the escrow agent attempts to act in good faith, the escrow agent may not be able to protect the decryption keys held in escrow. An organization could pressure the escrow agent with legal action to compel a release of a key even though a justification of the organization falls short of a "valid federal warrant" or some other contractual criteria that had been previously agreed with an owner of a key held in escrow. Even worse, violent action could be used against an escrow agent to compel an action, such as releasing one or more of the keys held in escrow.

SUMMARY

In one or more embodiments, one or more systems, methods, and/or processes may obtain a key segment and encrypt the key segment, utilizing a result of cryptographic hash process, to produce first encrypted data. The first encrypted data may be encrypted, utilizing a first private encryption key, to produce second encrypted data. The second encrypted data may be provided, via a network, to a public ledger. The first private encryption key may be encrypted, utilizing the result of cryptographic hash process, to produce third encrypted data, and the third encrypted data may be provided, via the network, to a proxy agent.

In one or more embodiments, one or more systems, methods, and/or processes may receive, via a network, first encrypted data, encrypted from first data and determine, via the network and a public ledger, that compensation corresponding to an identification of a device is available. Second encrypted data, encrypted from second data, corresponding to the identification of the device may be received via the network and the public ledger. The second encrypted data may be decrypted to obtain the second data. The first encrypted data may be decrypted, utilizing a cryptographic hash of the second data, to obtain the first data, and the first data may be provided, via the network, to the public ledger. For example, the first data may be provided to the public ledger to retrieve the compensation.

In one or more embodiments, the compensation may be a null or of a zero value. In one example, the compensation may be considered optional when the compensation is the null or the zero value. In another example, when the compensation is the null or the zero value, the compensation may be or may be referred to as release information. For instance, one or more of a government agency and a corporate entity, among others, may provide and/or control one or more systems described herein, and the one or more of the government agency and the corporate entity may utilize the null or the zero value as the compensation.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIGS. 4A-4E provide sequence diagrams that illustrate entity operations, according to one or more embodiments;

DETAILED DESCRIPTION

Figure 1:
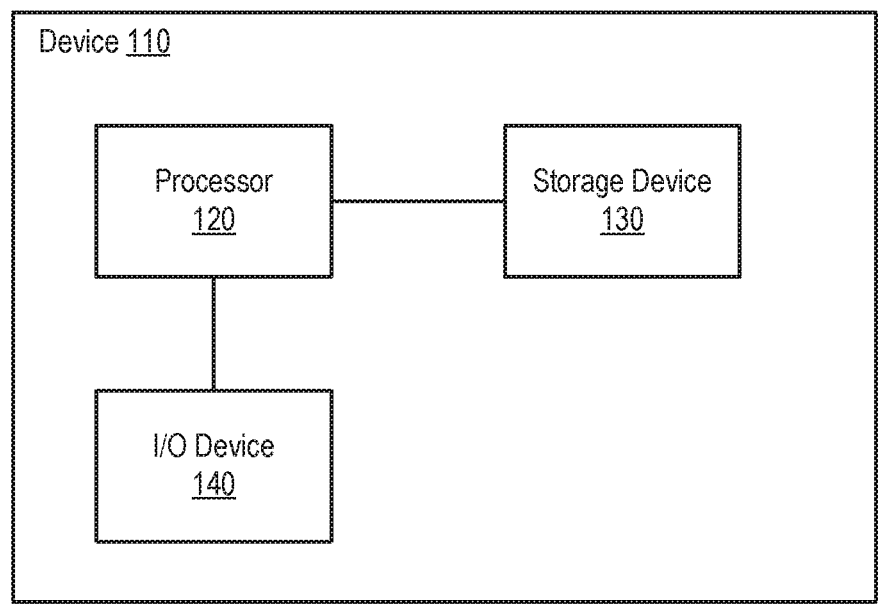
FIG. 1 illustrates an exemplary device and an exemplary computer system, according to one or more embodiments.
Figure 1:
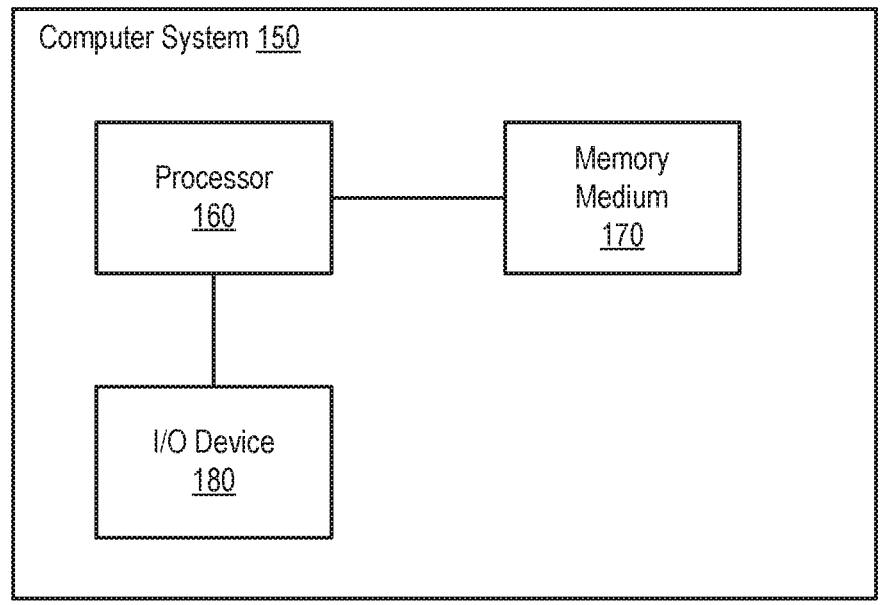

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, threshold key sharing may allow a cryptographic key to be split into multiple keys. For example, the cryptographic key may be split into N portions, where the cryptographic key may be recovered and/or produced via at least K portions of the N portions of the split cryptographic key, where K≤N. In one instance, the cryptographic key may be utilized to encrypt and/or decrypt data stored via a device, and the N portions of the split cryptographic key may be distributed to and/or held by one or more devices and/or one or more entities, where at least K portions of the N portions of the split cryptographic key may be obtained from the one or more devices and/or the one or more entities to produce the cryptographic key utilized to encrypt and/or decrypt data stored via the device. In another instance, if K−1, or less, portions of the N portions of the split cryptographic key are utilized, the cryptographic key may not be recovered and/or produced.

In one or more embodiments, utilizing threshold key sharing may include splitting a cryptographic key into three keys, where any two keys of the three keys may be used to perform one or more cryptographic operations. In one example, a first key of the three keys may be stored via a user device. In a second example, a second key of the three keys may be available via a service provider (e.g., a telecommunications service provider, a network service provider, an Internet service provider, etc.). In another example, a third key of the three keys may be issued to an escrow agent (EA) that may store information based on the third key in a public ledger. For instance, the information based on the third key may be retrieved from the public ledger at a later time, and the information based on the third key may be utilized to produce and/or retrieve the third key. In one or more embodiments, utilizing the information based on the third key to produce and/or retrieve the third key may include additional information from the public ledger, and the EA may provide further information to the public ledger so that the additional information from the public ledger may be retrieved. For example, when the EA provides the further information to the public ledger, the public ledger makes a record of the further information, which may be available to signal that the third key may be retrievable. For instance, the record of the further information may provide an audit trail that the third key may be retrievable.

In one or more embodiments, executing action via a public ledger may provide an audit trail of actions associated with a key (e.g., a key segment such as $Key_E$) held by the EA. For example, one or more systems, methods, and/or processes described herein may ensure that an action taken by the escrow agent, willingly or under duress, outside the public ledger will fail to provide access to a key held by the escrow agent. For instance, the systems, methods, and processes described herein may solve a need for an entity that may judge satisfaction of one or more contract terms (e.g., contract $D_1$) and/or may solve a privacy issue via hiding and/or obscuring $Key_E$.

In one or more embodiments, the EA may function as the entity that determines that one or more of the contract terms have been satisfied via the public ledger and not directly capable of providing access to $Key_E$. For example, a proxy agent may be utilized. For instance, the EA may provide the proxy agent access to $Key_E$ and then, destroy $Key_E$. For instance, the proxy agent may be tasked with re-creating and/or producing $Key_E$ or providing information for re-creating and/or producing $Key_E$ via the public ledger. In one or more embodiments, publication of $Key_E$ and/or the information for re-creating and/or producing $Key_E$ via the public ledger may create an audit trail, even if the EA acts in bad faith or is forced to act under duress.

Turning now to FIG. 1, an exemplary device and an exemplary computer system are illustrated, according to one or more embodiments. As shown, a device 110 may include a processor 120, a storage device 130 coupled to processor 120, and an input/output (I/O) device 140 coupled to processor 120. In one or more embodiments, storage device 130 may store information. For example, storage device 130 may store information from processor 120 and/or may provide stored information to processor 120. For instance, the information stored may include encrypted information, unencrypted information, or a combination of encrypted information and unencrypted information.

In one or more embodiments, storage device 130 may include persistent and/or volatile storage media. For example, storage device 130 may include one or more of fixed storage media, removable storage media, magnetic storage media, and semiconductor storage media, among others. In one instance, storage device 130 may include storage media such as non-transitory computer-readable media that stores data and/or instructions, such as data and/or executable code, for at least a period of time. In another instance, storage device 130 may include a hard disk drive, a platter of a hard disk drive, a sequential access storage device (e.g., a tape drive), a digital optical disc (e.g., a compact disk (CD), a digital versatile disc (DVD), a blu-ray disc, etc.), random access memory (RAM), read-only memory (ROM), electrically erasable programmable read-only memory (EEPROM), flash memory, non-transitory media, or one or more combinations of the foregoing, among others.

In one or more embodiments, I/O device 140 may provide access from device 110 and/or to device 110. In one example, device 140 may include one or more devices and/or circuitry that may permit and/or provide a user to interact with device 110 and/or its associated components by facilitating input from a user and output to a user. For instance, I/O device 140 may include user interface devices, such as a keyboard, a mouse, a screen, a touch screen, a microphone, a speaker, a joystick, any other I/O device suitable for user interaction with device 110, or any combination of the foregoing. In another example, I/O device 140 may include one or more devices and/or circuitry that may permit and/or provide another device and/or a network to interact with device 110. For instance, I/O device 140 may include interfaces such that the other device may interact with device 110 via a serial bus (e.g., a serial peripheral interface (SPI) bus, an inter-integrated circuit (I²C) bus, an universal serial bus (USB), a type-C bus, a peripheral component interconnect express (PCIe) bus, etc.), a parallel ATA (PATA) interface, a serial ATA (SATA) interface, a small computer system interface (SCSI) interface, a network interface (e.g., a wireless network interface, a wired network interface, an optical network interface, etc.), or a peripheral component interconnect (PCI) interface, or any combination of the foregoing, among others.

In one or more embodiments, processor 120 may execute processor instructions in implementing one or more systems, processes, and/or methods described herein. For example, the processor instructions may be configured, coded, and/or encoded with instructions in accordance with one or more of systems, flowcharts, methods, and/or processes described herein. In one or more embodiments, one or more of a storage medium and a memory medium may be a software product, a program product, and/or an article of manufacture. For example, the software product, the program product, and/or the article of manufacture may be configured, coded, and/or encoded with instructions, executable by a processor, in accordance with one or more of system, flowcharts, methods, and/or processes described herein. In one or more embodiments, processor 120 may include any suitable system, device, and/or apparatus operable to interpret and execute program instructions, process data, or both stored via a memory, or another storage device, and/or received via a network. In one or more embodiments, processor 120 may include one or more microprocessors, field programmable gate arrays (FPGAs), microcontrollers, digital signal processors (DSPs), application specific integrated circuits (ASICs), and/or other circuitry configured to interpret and/or execute program instructions, process data, or both.

In one or more embodiments, device 120 may include any type of device. For example, device 120 may include a personal digital assistant (PDA), a laptop computer system, a wireless telephonic device (e.g., a cellular telephone, a satellite telephone, etc.), a tablet computing device, a mobile computing system, a storage device (e.g., a hard disk driver, a solid state drive, a thumbdrive, a MultiMediaCard (MMC), a secure digital (SD) card, a micro SD card, a CompactFlash card, a subscriber identity module (SIM), a micro controller, a system on chip (SoC), a system on module (SOM), a digital music player, a smartwatch, a smartphone, a computer system, a server computer system, a data processing system, etc.

As shown, a computer system (CS) 150 may include a processor 160, a memory medium 170 coupled processor 160, and an I/O device 180 coupled to processor 160. In one or more embodiments, memory medium 170 may include persistent and/or volatile storage media. For example, memory medium 170 may include one or more of fixed storage media, removable storage media, magnetic storage media and semiconductor storage media, among others. In one instance, memory medium 170 may include storage media such as non-transitory computer-readable media that stores data and instructions, such as data and/or executable code, for at least a period of time. In another instance, memory medium 170 may include a hard disk drive, a platter of a hard disk drive, a sequential access storage device (e.g., a tape drive), a digital optical disc (e.g., a CD, a DVD, a blu-ray disc, etc.), RAM, ROM, EEPROM, flash memory, non-transitory media, or one or more combinations of the foregoing, among others.

In one or more embodiments, I/O device 180 may provide access from computer system 150 and/or to computer system 150. In one example, device 180 may include one or more devices and/or circuitry that may permit and/or provide a user to interact with computer system 150 and/or its associated components by facilitating input from a user and output to a user. For instance, I/O device 180 may include user interface devices, such as a keyboard, a mouse, a screen, a touch screen, a joystick, any other I/O device suitable for user interaction with computer system 150, or any combination of the foregoing, among others. In another example, device 180 may include one or more devices and/or circuitry that may permit and/or provide another device and/or a network to interact with computer system 150. For instance, I/O device 180 may include interfaces such that the other device may interact with computer system 150 via a serial bus (e.g., a SPI bus, an $I^2C$ bus, an USB, a type-C bus, a PCIe bus, etc.), a PATA interface, a SATA interface, a SCSI interface, a network interface (e.g., a wireless network interface, a wired network interface, an optical network interface, etc.), or a PCI interface, or any combination of the foregoing, among others.

In one or more embodiments, processor 160 may execute processor instructions in implementing one or more systems, processes, and/or methods described herein. For example, the processor instructions may be configured, coded, and/or encoded with instructions in accordance with one or more of systems, flowcharts, methods, and/or processes described herein. In one or more embodiments, one or more of a storage medium and a memory medium may be a software product, a program product, and/or an article of manufacture. For example, the software product, the program product, and/or the article of manufacture may be configured, coded, and/or encoded with instructions, executable by a processor, in accordance with one or more of systems, flowcharts, methods, and/or processes described herein. In one or more embodiments, processor 160 may include any suitable system, device, and/or apparatus operable to interpret and/or execute program instructions, process data, or both stored via a memory and/or received via a network. In one or more embodiments, processor 160 may include one or more microprocessors, FPGAs, microcontrollers, DSPs, ASICs, and/or other circuitry configured to interpret and execute program instructions, process data, or both.

In one or more embodiments, computer system 150 may include any type of computing device. For example, computer system 150 may include a PDA, a laptop computer system, a wireless telephonic device (e.g., a cellular telephone, a satellite telephone, etc.), a tablet computing device, a mobile computing system, a digital music player, a smartwatch, a smartphone, a server computer system, a data processing system, etc.

Figure 2:
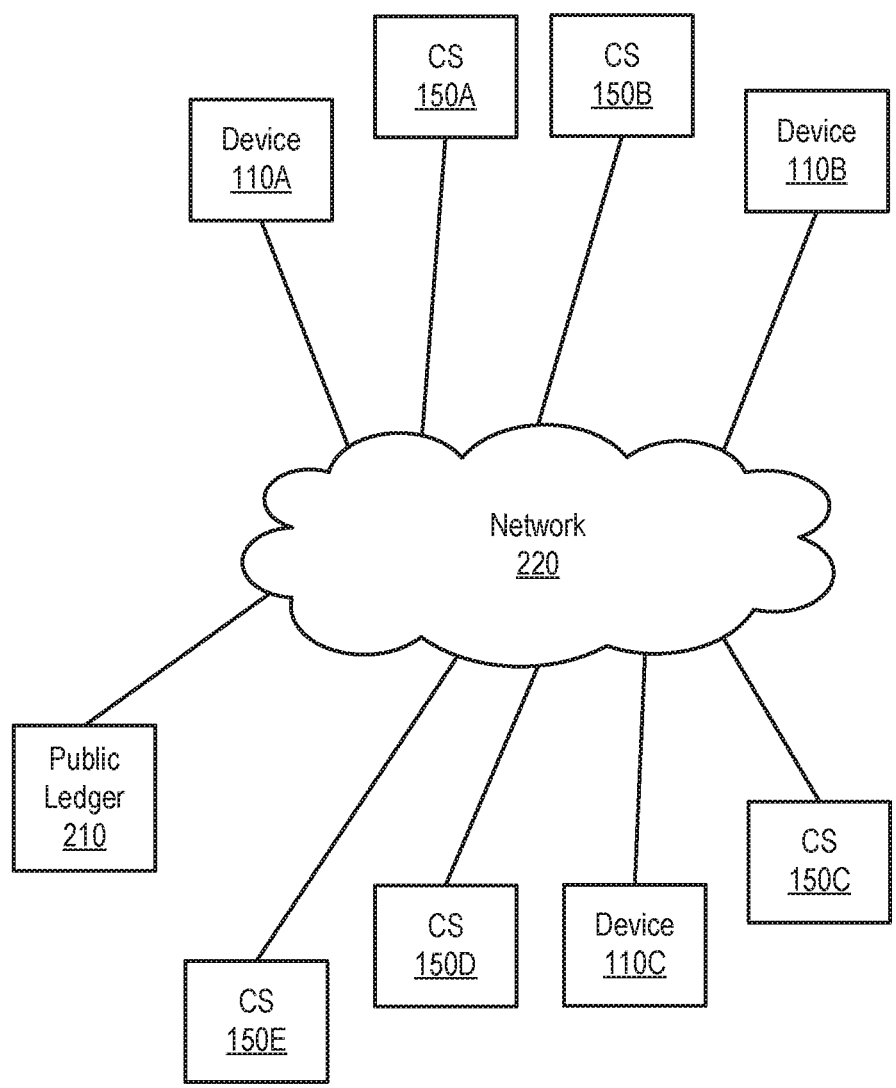
FIG. 2 illustrates exemplary devices and exemplary computer systems that are communicatively coupled to an exemplary network, according to one or more embodiments.

Turning now to FIG. 2, exemplary devices and exemplary computer systems that are communicatively coupled to an exemplary network are illustrated, according to one or more embodiments. As shown, devices 110A-110D, computer systems 150A-150E, and a public ledger 210 may be communicatively coupled to a network 220. In one or more embodiments, one or more of devices 110A-110D may be user devices. In one example, one or more of devices 110A-110D may be smartphones. In another example, one or more of devices 110A-110D may be tablet computing devices.

In one or more embodiments, one or more of computer systems 150A-150E may be utilized in implementing one or more systems, flowcharts, methods, and/or processes described herein. In one example, one or more of computer systems 150A and 150B may be utilized by a service provider. In a second example, one or more of computer systems 150C and 150D may be utilized by a proxy agent. In another example, a retrieval computer system may be or include computer system 150E. In one or more embodiments, public ledger 210 may include one or more computer systems (not shown) that may be utilized in implementing one or more systems, flowcharts, methods, and/or processes described herein.

Network 220, according to one or more embodiments, may include a wired network, a wireless network, an optical network, or a combination of the foregoing, among others. Network 220 may include and/or be coupled to various types of communications networks. For example, network 220 may include and/or be coupled to a wide area network (WAN) (e.g., a private WAN, a corporate WAN, a public WAN, etc.), an Internet, a local area network (LAN), a public switched telephone network (PSTN), a cellular telephone network, a satellite telephone network, etc.

Figure 3:
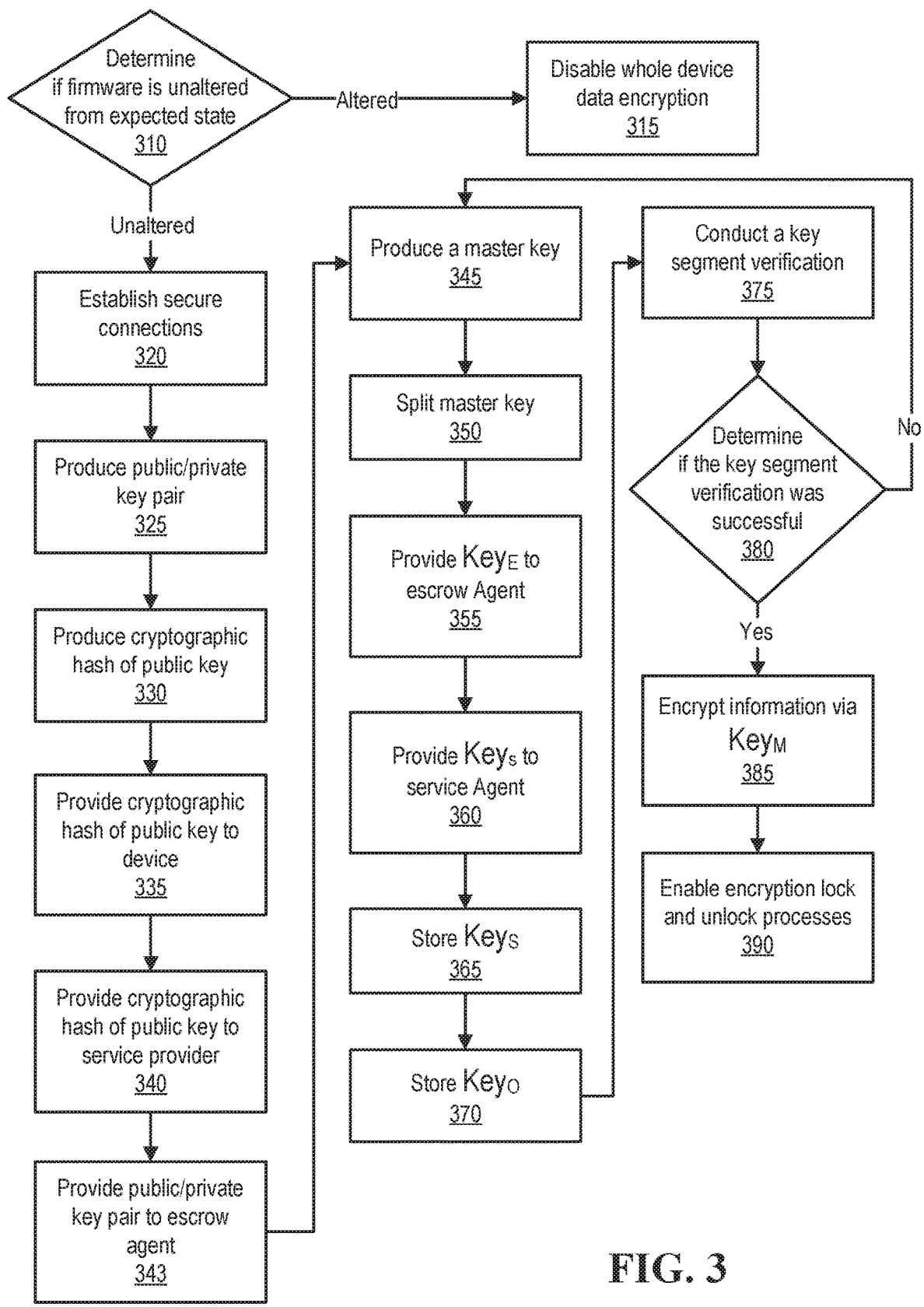
FIG. 3 illustrates an exemplary method of initializing a device, according to one or more embodiments.
Figure 4A:
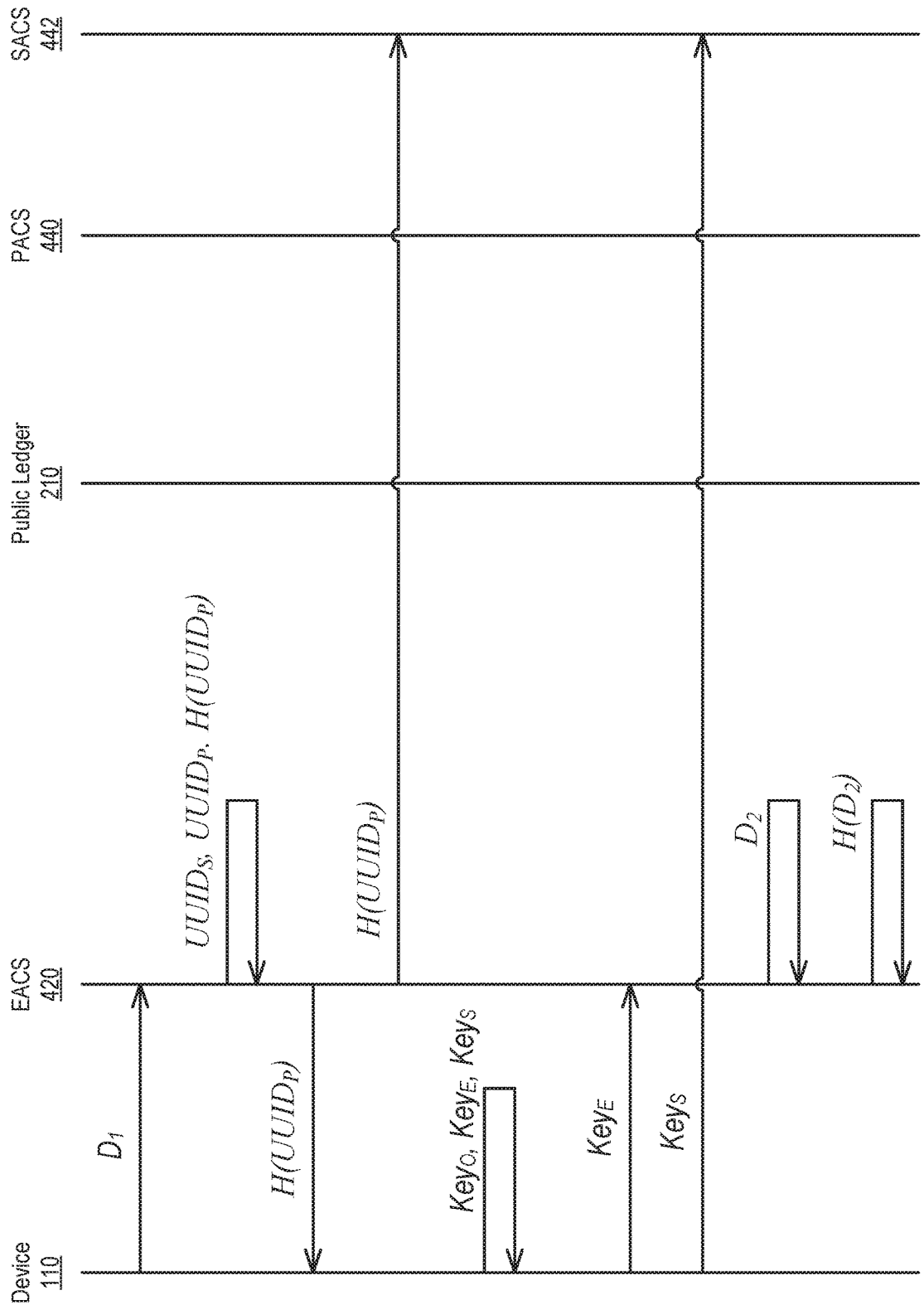
Figure 4B:
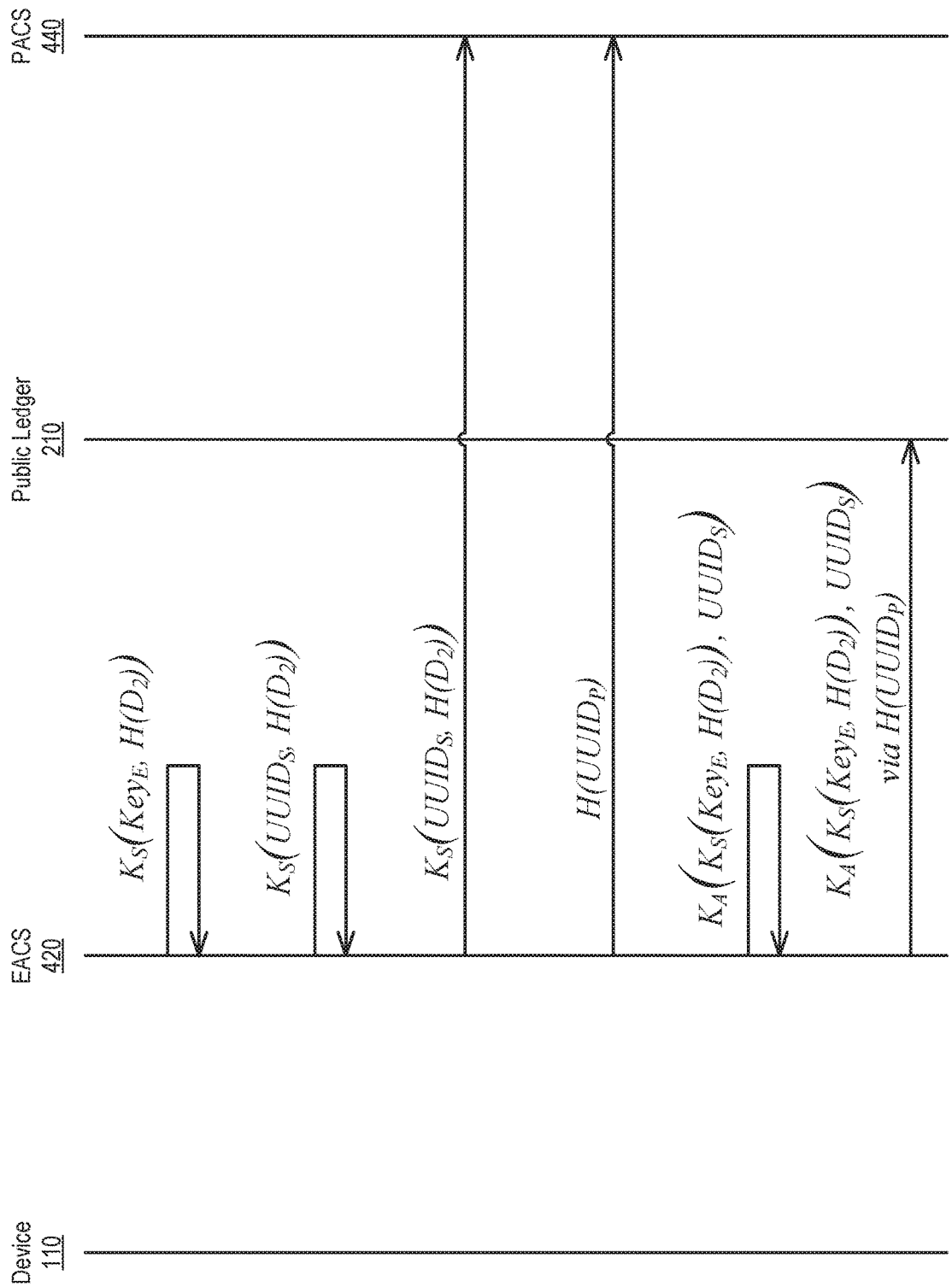
Figure 4D:
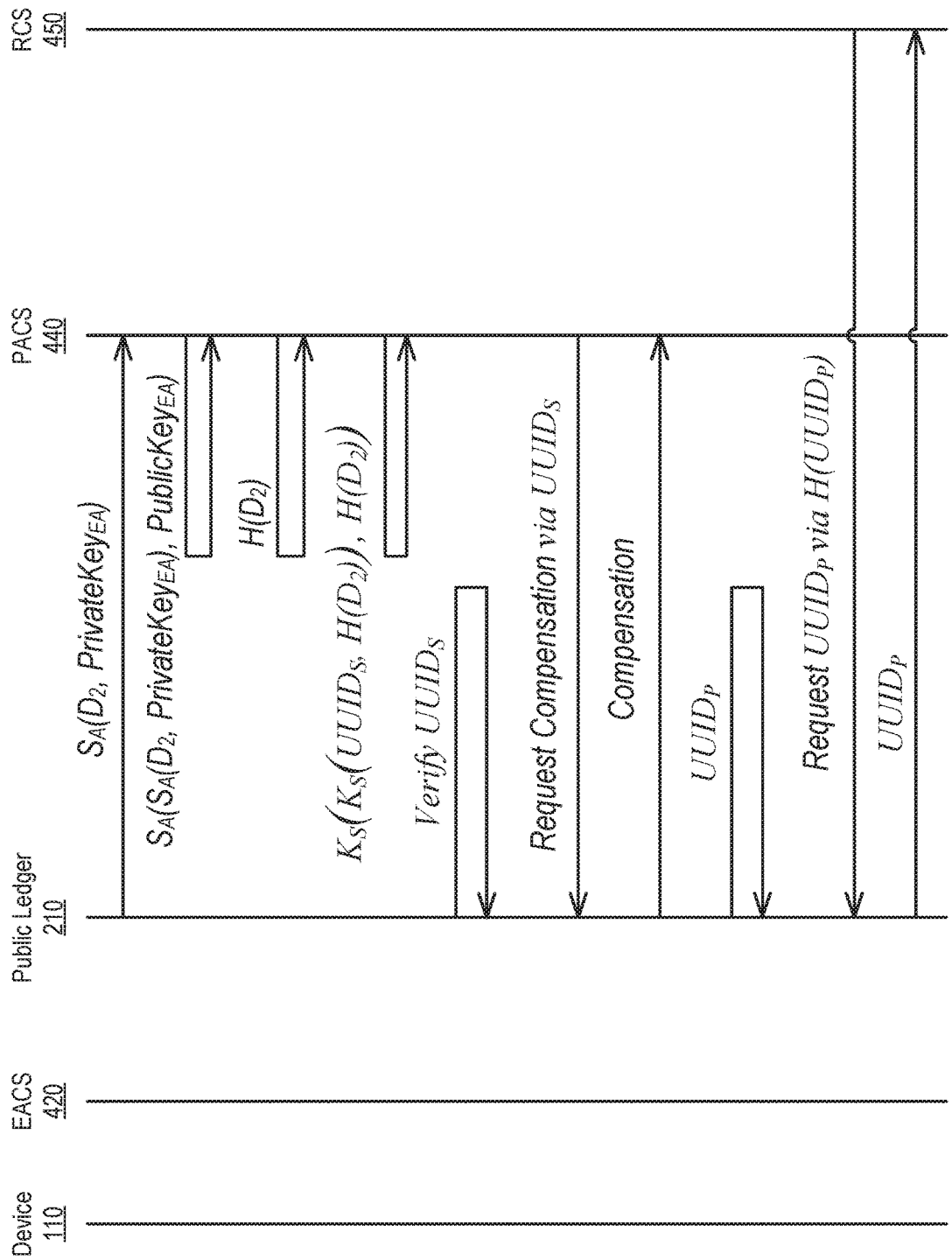
Figure 4E:
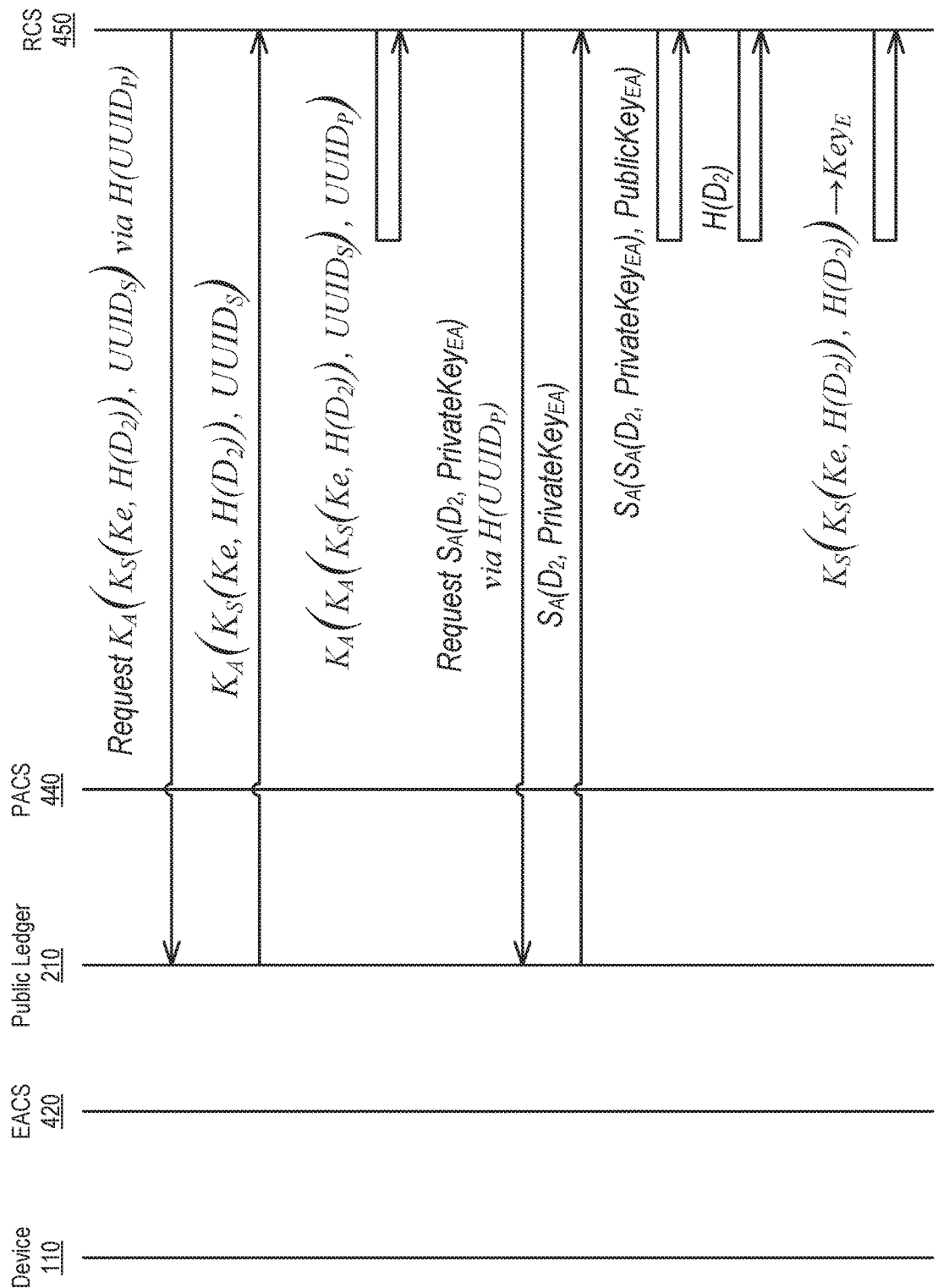

Turning now to FIG. 3, an exemplary method of initializing a device is illustrated, according to one or more embodiments. At 310, a device (e.g., device 110) may determine if its firmware is unaltered from an expected state. For example, the device may perform a device attestation to ensure that its firmware is unaltered from the expected state to determine if its firmware is unaltered from the expected state. If the firmware has been altered (e.g., the device attestation fails), support for whole device data encryption may be disabled at 315. In one or more embodiments, the device may be permitted to continue to boot if the device attestation fails. If the firmware has not been altered (e.g., the device attestation passes), the device may establish secure connections with a service provider and an escrow agent at 320.

In one or more embodiments, each of the service provider and escrow agent may utilize a computer system that include one or more functionalities and/or one or more structures as those described with reference with computer system 150 that may establish a secure connection with the device. For example, firmware of the device may include one or more uniform resource locators (URLs) that include information (e.g., logical names, addresses, etc.) that may be utilized in establishing the secure connections with respective computer systems of the service provider and the escrow agent. In one or more embodiments, the firmware of the device may be programmed with a public certificate and/or a URL of a government-approved registrar that provides the URLs (that include information that may be utilized in establishing the secure connections with respective computer systems of the service provider and the escrow agent) and that a trusted execution environment (TEE) protects.

In one or more embodiments, a TEE may include a secure area of a processor. For example, the TEE may ensure that processor instructions and data loaded are to be protected with respect to confidentiality and integrity. In one or more embodiments, the TEE may provide an isolated execution environment that may provide security features. In one example, the security features may include isolated execution and/or integrity of trusted applications along with confidentiality of their assets. In another example, the TEE execute in parallel with an operating system.

At 325, a public/private key pair may be produced. In one or more embodiments, the public key ($UUID_P$) may be produced from the private key ($UUID_S$). For example, a computer system associated with the escrow agent may produce $UUID_S$ and $UUID_P$. In one or more embodiments, $UUID_S$ and $UUID_P$ may be utilized with an asymmetric cryptographic process. At 330, a cryptographic hash of $UUID_P$ may be produced. For example, the computer system associated with the escrow agent may utilize a process to produce $H(UUID_P)$, where H is a cryptographic hash process. For instance, the cryptographic hash process may include at least one of a MD2, a MD4, a MD5, a SHA, a HAVAL, a SNEFRU, an Abreast Davies-Meyer, a Davies-Meyer, a RIPE-MDHash, a GOST, and a N-HASH, among others. At 335, $H(UUID_P)$ may be provided to the device. In one or more embodiments, the computer system associated with the escrow agent may provide $H(UUID_P)$ to the device via network 220.

At 340, $H(UUID_P)$ may be provided to a service provider. For example, the service provider may receive $H(UUID_P)$ and store $H(UUID_P)$. In one or more embodiments, the computer system associated with the escrow agent may provide $H(UUID_P)$ to the service provider via network 220. In one or more embodiments, the service provide may provide network services. In one example, the service provider may provide network services to the device that may permit the device to utilize a wireless telephone network. In one instance, the wireless telephone network may include a cellular telephone network. In another instance, the wireless telephone network may include a satellite telephone network. In a second example, the service provider may provide network services to the device that may permit the device to utilize a wired network. In a third example, the service provider may provide network services to the device that may permit the device to utilize an optical network. In another example, the service provider may provide network services to the device that may permit the device to utilize an Internet. In one or more embodiments, the service provider may utilize $H(UUID_P)$ as an identification number associated with a current cryptographic key set (e.g., $UUID_S$ and $UUID_P$).

At 343, the public/private key pair may be provided to the escrow agent. For example, the device may provide the public key and the private key pair. At 345, a master key ($Key_M$) may be produced. For example, the device may produce $Key_M$. For instance, the device may securely store $Key_M$ utilizing TEE. In one or more embodiments, $Key_M$ may be utilized in a symmetric cryptographic process that may encrypt and decrypt data stored via the device. For example, $Key_M$ may be utilized in a cryptographic process that may encrypt and decrypt data stored via storage device 130 of device 110. At 350, $Key_M$ may be split. In one or more embodiments, $Key_M$ may be split into multiple segments utilizing a threshold key sharing process. For example, the device may split $Key_M$ into multiple segments utilizing a threshold key sharing process. For instance, the device may split $Key_M$ into three segments, such as $Key_E$, $Key_O$, and $Key_S$, where any two segments of the three segments may be utilized to produce $Key_M$.

At 355, $Key_E$ may be provided to a computer system associated with the escrow agent. For example, the device may securely provide $Key_E$ to the computer system associated with the escrow agent. At 360, $Key_S$ may be provided to a computer system associated with the service provider. For example, the device may securely provide $Key_S$ to the computer system associated with the service provider. At 365, $Key_S$ may be stored. For example, the device may store $Key_S$ via TEE. At 370, $Key_O$ may be stored. In one example, the device may store $Key_O$ via a passphrase. For instance, a user of the device may provide the passphrase to the device, and the device may encrypt $Key_O$ via the passphrase and store $Key_O$, encrypted via the passphrase. In another example, the device may store $Key_O$ via TEE. In one or more embodiments, if the user knows the passphrase and desires to change the passphrase, the user may change the passphrase at any time. For example, the device may store $Key_O$ via a new passphrase.

At 375, a key segment verification may be conducted. For example, the device may conduct a key segment verification with respective computer systems of the escrow agent and the service provider to determine that $Key_E$ and $Key_S$ have been successfully transmitted to and received via the respective computer systems of the escrow agent and the service provider. For instance, conducting the key segment verification may include the device requesting $Key_E$ and $Key_S$ from the respective computer systems of the escrow agent and the service provider, receiving $Key_E$ and $Key_S$ from the respective computer systems of the escrow agent and the service provider, and verify, utilizing TEE, that $Key_O$ can be utilized with either $Key_E$ or $Key_S$ to produce $Key_M$. In one or more embodiments, communications with the respective computer systems of the escrow agent and the service provider may be performed in a secure fashion.

At 380, it may be determined if the key segment verification was successful. For example, if the device utilizes $Key_O$ with $Key_E$ to produce $Key_M$ and utilizes $Key_O$ wherein $Key_S$ to produce $Key_M$, then the key segment verification is successful. If the key segment verification was successful, information stored via the device may be encrypted at 385. In one example, at least a portion of the information stored via storage device 130 of device 110 may be encrypted via $Key_M$. In another example, all of the information stored via storage device 130 of device 110 may be encrypted via $Key_M$. If the key segment verification was not successful, the method may proceed to 345. At 390, encryption lock and unlock processes may be enabled.

In one or more embodiments, utilization of the method illustrated in FIG. 3, data of the device may be protected via whole-device encryption. For example, unlocking the device for use and/or access to its data may require entering a code into the device. For instance, the code may include $Key_M$ or the passphrase that may produce $Key_M$. In one or more embodiments, the device may store $P(Key_O)$, which is information derived from the passphrase and $Key_O$, and if the device receives a particular passphrase and utilizes the particular passphrase and $Key_O$ to derive $P(Key_O)$, then the device may be unlocked. For example, the device may be unlocked for utilization by a user that provided the particular passphrase.

In one or more embodiments, if a raw key code is entered, it may be assumed that the entered raw key code is $Key_E$. For example, $Key_E$ may be utilized with a stored $Key_S$, or $Key_S$ retrieved from the service provider, to produce $Key_M$. If the produced $Key_M$ matches the stored value for $Key_M$, then the device may be unlocked.

In one or more embodiments, decryption of information stored via the device may be instantiated under various circumstances. In one example, data from a backup may be recovered if the device is damaged or stolen. For instance, the passphrase-encrypted owner key $P(Key_O)$ and $Key_S$ may be utilized to recover the data from the backup. In a second example, encrypted data from the device may be recovered even if the owner forgets the passphrase by utilizing $Key_S$ and $Key_E$. For instance, a new set of segment keys may be generated for the device. In another example, encrypted data from the device may be recovered via a law enforcement officer, law enforcement agency, and/or a legal representative of an owner of the device with or without cooperation of the owner of the device by utilizing $Key_S$ and $Key_E$. In one instance, the owner may simply be uncooperative. In another instance, the owner may not be able to be cooperative, as the own may be incapacitated, unavailable, deceased, etc. In one or more embodiments, these situations may involve disclosing $Key_S$ and/or $Key_E$. For example, the service provider may issue a remote command triggering a new key generation sequence at a next device boot-up, utilizing $Key_S$ as an authorization token.

In one or more embodiments, even if the escrow agent attempts to act in good faith, the escrow agent may be unable to do so. In one example, an organization may pressure the escrow agent with legal action to compel a release of $Key_E$ even though a justification may fall short of a "valid federal warrant" or other contractual criteria that had been previously agreed with the owner of the device. In a second example, coercion may be used against the escrow agent to compel a release of $Key_E$. In another example, violent action may be used against the escrow agent to compel a release of $Key_E$.

In one or more embodiments, utilizing a public ledger may isolate and/or insulate the escrow agent from one or more possible compellations. For example, the public ledger may provide an audit trail that may mitigate or abate one or more possible compellations, as the public ledger would exhibit and/or publicize a release of $Key_E$ or information utilizable to produce $Key_E$. Moreover, the escrow agent may no longer retain $Key_E$, according to one or more embodiments. For example, the escrow agent may provide information to the public ledger that is utilizable to obtain $Key_E$, though in obtaining $Key_E$, the public ledger would exhibit and/or publicize a release of information that is utilizable to obtain $Key_E$. For instance, in exhibiting and/or publicizing the release of information that is utilizable to obtain $Key_E$ may create an audit trail that $Key_E$ may have been weakened or compromised. In one or more embodiments, obtaining a key may include producing the key from information. For example, obtaining $Key_E$ may from the released information may include producing $Key_E$ from the released information.

In one or more embodiments, a public ledger may include a distributed database. For example, the distributed database may maintain list of ordered records, and each record may include a timestamp and a link to a previous record. For instance, these records may be referred to as blocks, and the distributed database may include a blockchain. In one or more embodiments, decentralized consensus may be achieved with a blockchain. For example, the blockchain may include a distributed computing system with high byzantine fault tolerance.

In one or more embodiments, the blockchain may record bitcoin transactions. For example, the transactions may be processed without a trusted central authority, and maintenance of the blockchain may be performed via a network of communicating computer systems executing bitcoin software. For instance, a transaction of a form where payer C sends D bitcoins to payee E may be broadcast to the network of communicating computer systems executing the bitcoin software, and the network of communicating computer systems executing the bitcoin software may validate the transaction, add the transaction to their respective copies of the public ledger, and broadcast the ledger addition to other communicating computer systems executing the bitcoin software.

Turning now to FIGS. 4A-4E, sequence diagrams are provided that illustrate entity operations, according to one or more embodiments. As shown, device 110 may a contract $(D_1)$ to an escrow agent computer system (EACS) 420. For example, device 110 may provide $D_1$ via network 220. In one or more embodiments, EACS 420 may include one or more functionalities and/or one or more structures as those described with reference to computer system 150. EACS 420 may receive $D_1$.

In one or more embodiments, EACS 420 may produce $UUID_S$, $UUID_P$, and $H(UUID_P)$. As illustrated, EACS 420 may provide $H(UUID_P)$ to device 110 and to a service agent computer system (SACS) 442. For example, EACS 420 may provide $H(UUID_P)$ to device 110 and to SACS 442 via network 220. In one or more embodiments, SACS 442 may include one or more functionalities and/or one or more structures as those described with reference to computer system 150.

In one or more embodiments, device 110 may produce $Key_O$, $Key_E$, and $Key_S$ from $Key_M$. As shown, device 110 may provide $Key_E$ and $Key_S$ to EACS 420 and SACS 442, respectively. For example, device 110 may provide $Key_E$ and $Key_S$ to EACS 420 and SACS 442, respectively, via network 220.

In one or more embodiments, EACS 420 may produce a document ($D_2$) that includes a nonce (e.g., a cryptographic nonce such as a number that may only be utilized once) and information that indicates that at least one term of $D_1$ has been satisfied to release information to a public ledger 210. EACS 420 may utilize a process to produce $H(D_2)$, where H is a cryptographic hash function. EACS 420 may determine a result from $K_S(Key_E, H(D_2))$, where $K_S$ represents a symmetric cryptographic process, and may determine a result from $K_S(UUID_S, H(D_2))$. EACS 420 may provide the result from $K_S(UUID_S, H(D_2))$ to a proxy agent computer system (PACS) 440. EACS 420 may provide $H(UUID_P)$ to PACS 440.

EACS 420 may determine a result from $K_A(K_S(Key_E, H(D_2)), UUID_S)$, where $K_A$ represents an asymmetric cryptographic process. EACs 420 may provide the result from $K_A(K_S(Key_E, H(D_2)), UUID_S)$ to public ledger 210. For example, the result from $K_A(K_S(Key_E, H(D_2)), UUID_S)$ may be associated with $H(UUID_P)$, which may be utilized to associate other information with device 110 via public ledger 210. For instance, $H(UUID_P)$ may be utilized as an address of public ledger 210 and/or index into public ledger 210.

In one or more embodiments, EACS 420 may destroy (e.g., completely delete, overwrite, etc.) at least one of $Key_E$ and $UUID_S$. For example, destroying at least one of $Key_E$ and $UUID_S$ may mitigate or abate one or more possible compellations of the escrow agent to disclose $Key_E$ and/or $UUID_S$. For instance, EACS 420 may destroy $Key_E$ and $UUID_S$ to maximize mitigation or abatement of one or more possible compellations of the escrow agent to disclose $Key_E$ and/or $UUID_S$.

In one or more embodiments, EACS 420 may determine a result from $S_A(D_1, PrivateKey_{EA})$, where $S_A$ is an asymmetric cryptographic process. EACS 420 may provide the result from $S_A(D_1, PrivateKey_{EA})$ to public ledger 210. For example, the result from $S_A(D_1, PrivateKey_{EA})$ may be associated with $H(UUID_P)$, which may be utilized to associate other information with device 110 via public ledger 210. For instance, $H(UUID_P)$ may be utilized as an address of public ledger 210 and/or index into public ledger 210. In one or more embodiments, the result from $S_A(D_1, PrivateKey_{EA})$ may be obtained via public ledger 210 and the escrow agent's public key, $PublicKey_{EA}$, may be obtained via a computer system associated with the escrow agent. For example, $D_1$ may be obtain via $S_A(S_A(D_1, PrivateKey_{EA}), PublicKey_{EA})$. For instance, anyone may obtain $D_1$ to determine one or more terms of the contract. In one or more embodiments, EACS 420 may provide $D_1$ to public ledger 210 without encrypting $D_1$. Although not specifically illustrated, EACS 420 may provide $D_1$ to public ledger 210, for example.

In one or more embodiments, $D_1$ may be satisfied, and the escrow agent may provide information that would permit $Key_E$ to be produced. For example, EACS 420 may receive an indication that $D_1$ was satisfied. In one or more embodiments, EACS 420 may determine a result from $S_A(D_2, PrivateKey_{EA})$. EACS 420 may provide the result from $S_A(D_2, PrivateKey_{EA})$ to public ledger 210. For example, the result from $S_A(D_2, PrivateKey_{EA})$ may be associated with $H(UUID_P)$, which may be utilized to associate other information with device 110 via public ledger 210. For instance, $H(UUID_P)$ may be utilized as an address of public ledger 210 and/or index into public ledger 210. In one or more embodiments, the result from $S_A(D_2, PrivateKey_{EA})$ may be obtained via public ledger 210 and the escrow agent's public key, $PublicKey_{EA}$, may be obtained via a computer system associated with the escrow agent. For example, $D_2$ may be obtain via $S_A(S_A(D_2, PrivateKey_{EA}), PublicKey_{EA})$. For instance, anyone may obtain $D_2$ to determine $H(D_2)$, which may be utilized to obtain $Key_E$, described below.

As illustrated, EACS 420 may provide compensation to public ledger 210. For example, the compensation may be associated with $H(UUID_P)$, which may be utilized to associate information with device 110 via public ledger 210. For instance, $H(UUID_P)$ may be utilized as an address of public ledger 210 and/or index into public ledger 210.

In one or more embodiments, PACS 440 may be monitoring public ledger 210 for compensation associated with $H(UUID_P)$. For example, PACS 440 may receive one or more updates from public ledger 210. For instance, the one or more updates may indicate that compensation is associated with $H(UUID_P)$. In one or more embodiments, PACS 440 may request the result of $S_A(D_2, PrivateKey_{EA})$ from public ledger 210. For example, PACS 440 may utilize $H(UUID_P)$ in requesting the result of $S_A(D_2, PrivateKey_{EA})$ from public ledger 210.

In one or more embodiments, the compensation may be a null or of a zero value. In one example, the compensation may be optional when the compensation is the null or the zero value. In another example, when the compensation is the null or the zero value, the compensation may be or may be referred to as release information. In one instance, a government agency may provide and/or control one or more of public ledger 210, EACS 420, PACS 440, and SACS 442, among others, and the compensation may be the null or of the zero value when utilized. In another instance, an entity (e.g., a corporate entity) may provide and/or control one or more of public ledger 210, EACS 420, PACS 440, and SACS 442, among others, and the compensation may be the null or of the zero value when utilized.

In one or more embodiments, PACS 440 may receive the result of $S_A(D_2, PrivateKey_{EA})$ from public ledger 210. PACS 440 may determine a result of $S_A(S_A(D_2, PrivateKey_{EA}), PublicKey_{EA})$, which may produce $D_2$. PACS 440 may determine a result of $H(D_2)$. PACS 440 may determine a result of $K_S(K_S(UUID_S, H(D_2)), H(D_2))$, which may produce $UUID_S$. In one or more embodiments, PACS 440 may request the compensation, via $UUID_S$, from public ledger 210. For example, PACS 440 may utilize $H(UUID_P)$ as an address of public ledger 210 and/or an index into public ledger 210 to retrieve the compensation. In one or more embodiments, public ledger 210 may verify $UUID_S$.

In one or more embodiments, public ledger 210 may exhibit and/or publicize $UUID_P$. For example, public ledger 210 may exhibit and/or publicize $UUID_P$ when the compensation is assigned, deposited, and/or dispersed to an account associated with PACS 440 and/or the proxy agent. In one or more embodiments, a retrieval computer system (RCS) 450 may request $UUID_P$. For example, RCS 450 may utilize $H(UUID_P)$ as an address of public ledger 210 and/or an index into public ledger 210 to retrieve the $UUID_P$.

In one or more embodiments, RCS 450 may request the result of $K_A(K_S(Key_E, H(D_2)), UUID_S)$ from public ledger 210. For example, RCS 450 may utilize $H(UUID_P)$ as an address of public ledger 210 and/or an index into public ledger 210 to retrieve the result of $K_A(K_S(Key_E, H(D_2)), UUID_S)$. RCS 450 may receive the result of $K_A(K_S(Key_E, H(D_2)), UUID_S)$ from public ledger 210. In one or more embodiments, RCS 450 may determine a result of $K_A(K_A(K_S(Key_E, H(D_2)), UUID_S), UUID_P)$ to produce $K_S(Key_E, H(D_2))$. In one or more embodiments, RCS 450 may request the result of $S_A(D_2, PrivateKey_{EA})$ from public ledger 210. For example, RCS 450 may utilize $H(UUID_P)$ as an address of public ledger 210 and/or an index into public ledger 210 to retrieve the result of $S_A(D_2, PrivateKey_{EA})$. In one or more embodiments, RCS 450 may determine a result of $S_A(S_A(D_2, PrivateKey_{EA}), PubliceKey_{EA})$ to produce $D_2$. RCS 450 may determine a result of $H(D_2)$. In one or more embodiments, RCS 450 may determine a result of $K_S(K_S(Key_E, H(D_2)), H(D_2))$ to obtain $Key_E$. For example, obtaining $Key_E$ may include producing $Key_E$. For instance, in obtaining $Key_E$, RCS 450 may determine a result of $K_S(K_S(Key_E, H(D_2)), H(D_2))$ to produce $Key_E$.

After $Key_E$ is obtained, $Key_E$ may be utilized with one or more of $Key_S$ and $Key_O$ to obtain $Key_M$, according to one or more embodiments. For example, obtaining $Key_M$ may include utilizing $Key_E$ with one or more of $Key_S$ and $Key_O$ to produce $Key_M$. In one or more embodiments, $Key_M$ may be utilized to access data of device 110. For example, $Key_M$ may be utilized to access encrypted data stored via storage device 130 of device 110. For instance, $Key_M$ may be utilized to unlock device 110 and/or to decrypt data that was previously encrypted and stored via storage device 130 of device 110.

In one or more embodiments, existence and terms of information released (e.g., $UUID_P$) that may be utilized to produce $Key_M$ may be exhibited and/or publicized via public ledger 210. For example, anyone may retrieve the information released, and the information released may never be altered and/or may never be removed from public ledger 210. In one or more embodiments, the escrow agent generates a document stating that the terms of $D_1$ have been satisfied. For example, the escrow agent generates $D_2$ and the result of $S_A(D_2, PrivateKey_{EA})$, which may be a legal endorsement by the escrow agent, as the escrow agent utilized $PrivateKey_{EA}$, which may be considered a digital signature. For instance, it may be more difficult legally to compel the escrow agent to lie than it may be to compel the escrow to perform some other silent action. By utilizing actions of the escrow agent via public ledger 210, an additional layer of protection and/or vigilance may be provided, according to one or more embodiments.

Figure 5:
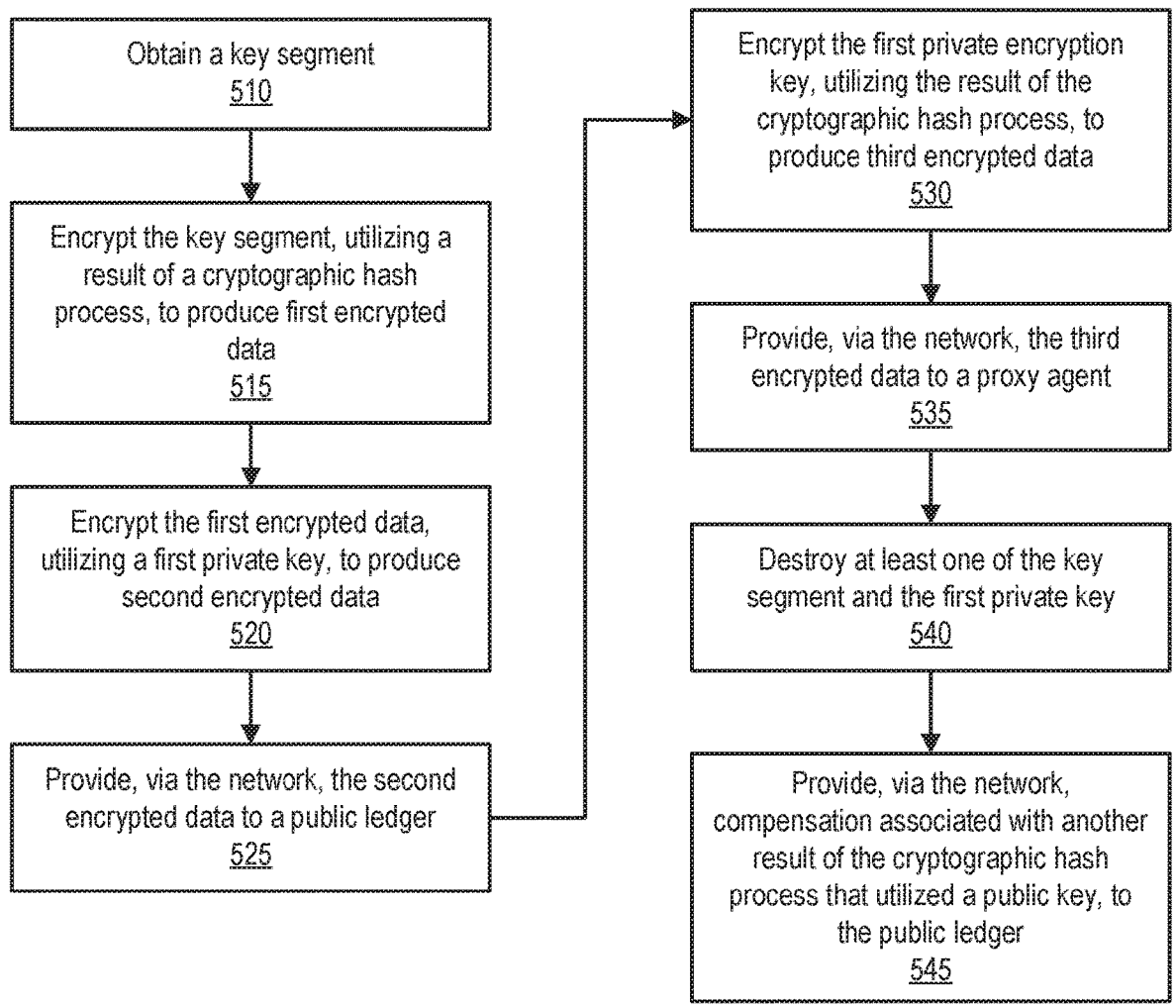
FIG. 5 illustrates a method of operating an escrow agent computer system, according to one or more embodiments.

Turning now to FIG. 5, a method of operating an escrow agent computer system is illustrated, according to one or more embodiments. At 510, a key segment may be obtained. For example, $Key_E$ may be obtained. In one instance, EACS 420 may obtain $Key_E$ via receiving $Key_E$ via network 220. In another instance, EACS 420 may obtain $Key_E$ via a threshold secret sharing process. In one or more embodiments, when EACS 420 obtains $Key_E$ via a threshold secret sharing process, EACS 420 may produce $Key_E$ via the threshold secret sharing process and $Key_M$. At 515, the key segment may be encrypted, utilizing a result of a cryptographic hash process, to produce first encrypted data. For example, $Key_E$ may be encrypted, utilizing a result of $H(D_2)$, to produce a result from $K_S(Key_E, H(D_2))$. For instance, EACS 420 may encrypt $Key_E$, utilizing a result of $H(D_2)$, to produce the result from $K_S(Key_E, H(D_2))$.

At 520, the first encrypted data may be encrypted, utilizing a first private key, to produce second encrypted data. For example, the result from $K_S(Key_E, H(D_2))$ may be encrypted, utilizing $UUID_S$, to produce a result from $K_A(K_S(Key_E, H(D_2)), UUID_S)$. For instance, EACS 420 may encrypt the result from $K_S(Key_E, H(D_2))$, utilizing $UUID_S$, to produce the result from $K_A(K_S(Key_E, H(D_2)), UUID_S)$. At 525, the second encrypted data may be provided, via the network, to a public ledger. For example, the result from $K_A(K_S(Key_E, H(D_2)), UUID_S)$ may be provided to the public ledger. For instance, EACS 420 may provide the result from $K_A(K_S(Key_E, H(D_2)), UUID_S)$ to public ledger 210 via network 220.

At 530, the first private encryption key may be encrypted, utilizing a result of a cryptographic hash process, to produce third encrypted data. For example, $UUID_S$ may be encrypted, utilizing the result of $H(D_2)$, to produce a result from $K_S(UUID_S, H(D_2))$. For instance, EACS 420 may encrypt $UUID_S$, utilizing the result of $H(D_2)$, to produce the result from $K_S(UUID_S, H(D_2))$. At 535, the third encrypted data may be provided, via the network, to a proxy agent. For example, the result from $K_S(UUID_S, H(D_2))$ may be provided, via the network, to the proxy agent. For instance, EACS 420 may provide the result from $K_S(UUID_S, H(D_2))$, via network 220, to PACS 440.

At 540, at least one of the key segment and the first private key may be destroyed. For example, at least one of $Key_E$ and $UUID_S$ may be destroyed. For instance, EACS 420 may destroy at least one of $Key_E$ and $UUID_S$. In one or more embodiments, destroying at least one of $Key_E$ and $UUID_S$ may include completely deleting or overwriting at least one of $Key_E$ and $UUID_S$. For example, EACS 420 may destroy at least one of $Key_E$ and $UUID_S$. For instance, after EACS 420 destroys at least one of $Key_E$ and $UUID_S$, the at least one of $Key_E$ and $UUID_S$ may not be recovered. In one or more embodiments, destroying at least one of $Key_E$ and $UUID_S$ may mitigate or abate one or more possible compellations of the escrow agent to disclose $Key_E$ and/or $UUID_S$. For example, EACS 420 may destroy both of $Key_E$ and $UUID_S$ to maximize mitigation or abatement of one or more possible compellations of the escrow agent to disclose $Key_E$ and/or $UUID_S$.

At 545, compensation, associated with another result of the cryptographic hash process, may be provided, via the network, to the public ledger. For example, compensation, associated with $H(UUID_P)$ (e.g., an identification associated with a device, such as device 110), may be provided, via the network to the public ledger. For instance, EACS 420 may provide compensation, associated with $H(UUID_P)$ (e.g., an account identification), to public ledger 210 via network 220.

Figure 6:
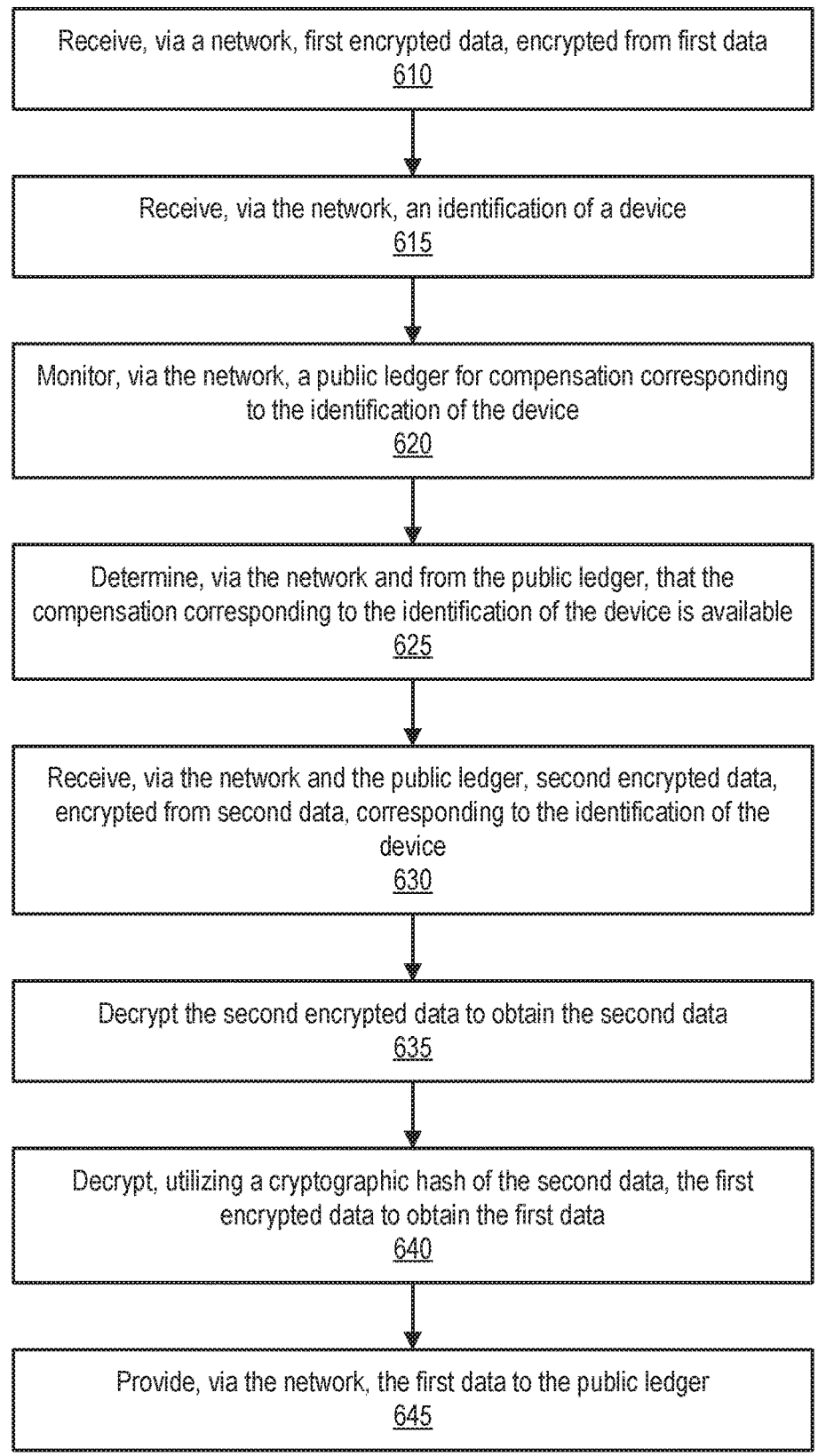
FIG. 6 illustrates a method of operating a proxy agent computer system, according to one or more embodiments.

Turning now to FIG. 6, a method of operating a proxy agent computer system is illustrated, according to one or more embodiments. At 610, first encrypted data, encrypted from first data, may be received via a network. For example, a result from $K_S(UUID_S, H(D_2))$, encrypted from $UUID_S$, may be received via a network. For instance, PACS 440 may receive, via network 220, the result from $K_S(UUID_S, H(D_2))$.

At 615, an identification of a device may be received via a network. For example, the account information of the device (e.g., device 110) may be $H(UUID_P)$, and $H(UUID_P)$ may be received via the network. For instance, PACS 440 may receive $H(UUID_P)$ via network 220. At 620, a public ledger may be monitored for compensation corresponding to the identification of the device. For example, the public ledger may be monitored for compensation corresponding to $H(UUID_P)$. For instance, PACS 440 may monitor public ledger 210 for compensation corresponding to $H(UUID_P)$.

At 625, it may be determined, via the network and the public ledger, that the compensation corresponding to the identification of the device is available. For example, it may be determined that the compensation corresponding to $H(UUID_P)$ is available. For instance, PACS 440 may determine that the compensation corresponding to $H(UUID_P)$ is available. At 630, second encrypted data, encrypted from second data, may be received via the network and the public ledger. For example, a result from $S_A(D_2, PrivateKey_{EA})$, encrypted from $D_2$, may be received via the network and the public ledger. For instance, PACS 440, may receive the result from $S_A(D_2, PrivateKey_{EA})$ via network 220 and public ledger 210.

At 635, the second encrypted data may be decrypted to obtain the second data. For example, the result from $S_A(D_2, PrivateKey_{EA})$, may be decrypted to obtain $D_2$. For instance, PACA 440 may determine a result of $S_A(S_A(D_2, PrivateKey_{EA}), PublicKey_{EA})$ to obtain $D_2$.

At 640, the first encrypted data may be decrypted, utilizing a cryptographic hash of the second data, to obtain the first data. For example, a result from $K_S(K_S(UUID_S, H(D_2)), H(D_2))$ may produce $UUID_S$. For instance, PACS 440 may determine the result from $K_S(K_S(UUID_S, H(D_2)), H(D_2))$ to produce $UUID_S$. At 645, the first data may be provided to the public ledger. For example, $UUID_S$ may be provided to the public ledger. For instance, PACS 440 may provide $UUID_S$ to public ledger 210. In one or more embodiments, PACS may provide $UUID_S$ to public ledger 210 to retrieve the compensation.

In one or more embodiments, one or more of the method, process, and/or diagram elements described herein may be performed in varying orders and/or may be repeated. In one or more embodiments, one or more of the method, process, and/or diagram elements described herein may be omitted. One or more of the system elements described herein can be omitted and/or additional system elements can be added as desired, according to one or more embodiments. Further, additional, supplementary, and/or duplicated process, diagram, and/or method elements may be instantiated and/or performed as desired, according to one or more embodiments.

The appended claims are intended to cover all such modifications, enhancements, and other embodiments which fall within the true spirit and scope of the present disclosure, and as such, the disclosed subject matter is to be considered illustrative, and not restrictive. The scope of the present disclosure is to be determined by the broadest permissible interpretation of the following claims and their equivalents, to the maximum extent allowed by law, and shall not be restricted or limited by the foregoing detailed description.

What is claimed is:

1. A method, comprising:
   obtaining, via a network, a single key segment of a plurality of key segments utilizable to produce a master symmetric encryption key utilized to encrypt and decrypt data of a mobile computing device;
   encrypting the single key segment, utilizing a result of a cryptographic hash process, to produce first encrypted data;
   producing a first private encryption key and a first public encryption key, wherein the first public encryption key is produced from the first private encryption key, wherein each of the first private encryption key and the first public encryption key is for utilization in an asymmetric cryptographic process, and wherein each of the first private encryption key and the first public encryption key is different from the master symmetric encryption key;
   encrypting, via the asymmetric cryptographic process, the first encrypted data, utilizing the first private encryption key, to produce second encrypted data;
   providing, via the network, the second encrypted data to a public ledger;
   encrypting the first private encryption key, utilizing the result of the cryptographic hash process, to produce third encrypted data; and
   providing, via the network, the third encrypted data to a proxy agent computer system.

2. The method of claim 1, further comprising:
   providing, via the network and to the public ledger, compensation associated with a cryptographic hash of the first public encryption key.

3. The method of claim 2, wherein the compensation is at least one of a null or zero value.

4. The method of claim 1, further comprising:
   destroying at least one of the single key segment and the first private encryption key.

5. The method of claim 1, wherein the single key segment was produced via a threshold secret sharing process.

6. The method of claim 1, further comprising:
   encrypting, utilizing a second private key, a contract to produce an encrypted contract, wherein the contract includes one or more terms to satisfy to release information utilizable to obtain the single key segment; and
   providing the encrypted contract to the public ledger.

7. The method of claim 1, further comprising:
   providing a contract to the public ledger.

8. The method of claim 1, wherein the public ledger includes a blockchain.

9. The method of claim 8, wherein the blockchain is a bitcoin blockchain.

10. One or more computer-readable non-transitory storage media that includes processor-executable instructions, that when executed via a processor of a system, the system:
    obtains, via a network, a single key segment of a plurality of key segments utilizable to produce a master symmetric encryption key utilized to encrypt and decrypt data of a mobile computing device;
    encrypts the single key segment, utilizing a result of a cryptographic hash process, to produce first encrypted data;
    produces a first private encryption key and a first public encryption key, wherein the first public encryption key is produced from the first private encryption key, wherein each of the first private encryption key and the first public encryption key is for utilization in an asymmetric cryptographic process, and wherein each of the first private encryption key and the first public encryption key is different from the master symmetric encryption key;
    encrypts, via the asymmetric cryptographic process, the first encrypted data, utilizing the first private encryption key, to produce second encrypted data;
    provides, via the network, the second encrypted data to a public ledger;
    encrypts the first private encryption key, utilizing the result of the cryptographic hash process, to produce third encrypted data; and
    provides, via the network, the third encrypted data to a proxy agent computer system.

11. The one or more computer-readable non-transitory storage media of claim 10, wherein the one or more computer-readable non-transitory storage media further stores processor-executable instructions that when executed via the processor, the system:

provides, via the network and to the public ledger, compensation associated with a cryptographic hash of the first public encryption key.

12. The one or more computer-readable non-transitory storage media of claim 11, wherein the compensation is at least one of a null or zero value.

13. The one or more computer-readable non-transitory storage media of claim 10, wherein the one or more computer-readable non-transitory storage media further stores processor-executable instructions that when executed via the processor, the system:

destroys at least one of the single key segment and the first private encryption key.

14. The one or more computer-readable non-transitory storage media of claim 10, wherein the single key segment was produced via a threshold secret sharing process.

15. The one or more computer-readable non-transitory storage media of claim 10, wherein the one or more computer-readable non-transitory storage media further stores processor-executable instructions that when executed via the processor, the system:

encrypts, utilizing a second private key, a contract to produce an encrypted contract, wherein the contract includes one or more terms to satisfy to release information utilizable to obtain the single key segment; and provides the encrypted contract to the public ledger.

16. The one or more computer-readable non-transitory storage media of claim 10, wherein the one or more computer-readable non-transitory storage media further stores processor-executable instructions that when executed via the processor, the system:

provides a contract to the public ledger.

17. The one or more computer-readable non-transitory storage media of claim 10, wherein the public ledger includes a blockchain.

18. The one or more computer-readable non-transitory storage media of claim 17, wherein the blockchain is a bitcoin blockchain.

19. A method, comprising:

receiving, via a network, first encrypted data, encrypted from first data via a symmetric cryptographic process, wherein the first data includes a private encryption key associated with a first asymmetric encryption process;

receiving, via the network and a public ledger, second encrypted data, encrypted from second data via a second asymmetric cryptographic process corresponding to an identification of a computing device;

decrypting, via the second asymmetric cryptographic process, the second encrypted data to obtain the second data;

decrypting, via the symmetric cryptographic process utilizing a cryptographic hash of the second data, the first encrypted data to obtain the private encryption key;

providing, via the network, the private encryption key to the public ledger;

after the providing the private encryption key to the public ledger, receiving, via the network and the public ledger, a public encryption key associated with the private encryption key and associated with the first asymmetric encryption process;

decrypting, via the first asymmetric encryption process utilizing the public encryption key, third encrypted data to obtain third data that includes fourth encrypted data, which was encrypted from fourth data that includes a key segment of a plurality of key segments utilizable to produce a master symmetric encryption key utilized to encrypt and decrypt data of the computing device; and decrypting, via the symmetric encryption process, the fourth encrypted data to obtain the key segment.

20. The method of claim 19, further comprising:
monitoring the public ledger for the compensation corresponding to the identification of the computing device.

21. The method of claim 19, further comprising:
receiving, via the public ledger, the compensation in response to the providing, via the network, the private encryption key to the public ledger.

22. The method of claim 19, wherein the compensation is at least one of a null or zero value.

23. The method of claim 19, further comprising:
determining the cryptographic hash of the second data.

24. The method of claim 19, wherein the second encrypted data was encrypted via the second asymmetric cryptographic process utilizing a first encryption key.

25. The method of claim 19, wherein the identification of the computing device is an account identification of an account of the public ledger.

26. The method of claim 19, wherein the receiving, via the network, the first encrypted data, encrypted from the first data includes receiving the first encrypted data from an escrow agent computer system.

27. The method of claim 19, wherein the public ledger includes a blockchain.

28. The method of claim 27, wherein the blockchain is a bitcoin blockchain.

29. One or more computer-readable non-transitory storage media that includes processor-executable instructions, that when executed via a processor of a system, the system:

receives, via a network, first encrypted data, encrypted from first data via a symmetric cryptographic process, wherein the first data includes a private encryption key associated with a first asymmetric encryption process;

receives, via the network and a public ledger, second encrypted data, encrypted from second data via a second asymmetric cryptographic process, corresponding to an identification of the computing device;

decrypts, via the asymmetric cryptographic process, the second encrypted data to obtain the second data;

decrypts, via the symmetric cryptographic process utilizing a cryptographic hash of the second data, the first encrypted data to obtain the private encryption key;

provides, via the network, the first data to the public ledger;

after providing the private encryption key to the public ledger, receives, via the network and the public ledger, a public encryption key associated with the private encryption key and associated with the first asymmetric encryption process;

decrypts, via the first asymmetric encryption process utilizing the public encryption key, third encrypted data to obtain third data that includes fourth encrypted data, which was encrypted from fourth data that includes a key segment of a plurality of key segments utilizable to produce a master symmetric encryption key utilized to encrypt and decrypt data of the computing device; and decrypts, via the symmetric encryption process, the fourth encrypted data to obtain the key segment.

30. The one or more computer-readable non-transitory storage media of claim 29, wherein the one or more computer-readable non-transitory storage media further stores processor-executable instructions that when executed via the processor, the system:

monitors the public ledger for the compensation corresponding to the identification of the computing device.

31. The one or more computer-readable non-transitory storage media of claim 29, wherein the one or more computer-readable non-transitory storage media further stores processor-executable instructions that when executed via the processor, the system:

receives, via the public ledger, the compensation in response to the providing, via the network, the private encryption key to the public ledger.

32. The one or more computer-readable non-transitory storage media of claim 29, wherein the compensation is at least one of a null or zero value.

33. The one or more computer-readable non-transitory storage media of claim 29, wherein the one or more computer-readable non-transitory storage media further stores processor-executable instructions that when executed via the processor, the system:

determines the cryptographic hash of the second data.

34. The one or more computer-readable non-transitory storage media of claim 29, wherein the second encrypted data was encrypted via the second asymmetric cryptographic process utilizing a first encryption key.

35. The one or more computer-readable non-transitory storage media of claim 29, wherein when the system receives, via the network, the first encrypted data, encrypted from the first data, the system receives the first encrypted data from an escrow agent computer system.

36. The one or more computer-readable non-transitory storage media of claim 29, wherein the public ledger includes a blockchain.

37. The one or more computer-readable non-transitory storage media of claim 36, wherein the blockchain is a bitcoin blockchain.

* * * * *